(12) United States Patent
Hashimoto et al.

(10) Patent No.: US 7,920,715 B2
(45) Date of Patent: Apr. 5, 2011

(54) APPARATUS AND METHOD FOR EMBEDDING ELECTRONIC WATERMARK

(75) Inventors: Takashi Hashimoto, Saitama (JP); Kurato Maeno, Saitama (JP)

(73) Assignee: Oki Data Corporation, Tokyo (JP)

( * ) Notice: Subject to any disclaimer, the term of this patent is extended or adjusted under 35 U.S.C. 154(b) by 1071 days.

(21) Appl. No.: 11/700,940

(22) Filed: Feb. 1, 2007

(65) Prior Publication Data
US 2007/0183626 A1 Aug. 9, 2007

(30) Foreign Application Priority Data
Feb. 7, 2006 (JP) .................. 2006-030154

(51) Int. Cl.
*G06K 9/00* (2006.01)
(52) U.S. Cl. ....................................... 382/100
(58) Field of Classification Search .................. 382/100, 382/176, 275
See application file for complete search history.

(56) References Cited

U.S. PATENT DOCUMENTS

| | | | |
|---|---|---|---|
| 5,157,740 A * | 10/1992 | Klein et al. .................... 382/271 |
| 6,456,393 B1 * | 9/2002 | Bhattacharjya et al. ........ 358/1.9 |
| 7,016,411 B2 | 3/2006 | Azuma et al. |
| 7,039,215 B2 | 5/2006 | Suzaki |
| 7,085,399 B2 | 8/2006 | Suzaki |
| 7,260,260 B2 | 8/2007 | Kondo et al. |
| 7,379,594 B2 * | 5/2008 | Ferman et al. ................ 382/176 |
| 7,440,583 B2 | 10/2008 | Tohne et al. |
| 7,644,281 B2 * | 1/2010 | Deguillaume et al. ........ 713/176 |
| 2004/0052401 A1 * | 3/2004 | Suzaki .......................... 382/100 |
| 2004/0218799 A1 | 11/2004 | Mastie et al. |

FOREIGN PATENT DOCUMENTS

| | | |
|---|---|---|
| CN | 1395231 A | 2/2003 |
| CN | 1466736 A | 1/2004 |
| EP | 1619874 A1 | 1/2006 |
| JP | 3628312 | 4/2003 |

* cited by examiner

*Primary Examiner* — Tom Y Lu
(74) *Attorney, Agent, or Firm* — Rabin & Berdo, PC

(57) ABSTRACT

An electronic watermark embedding apparatus for embedding watermark information as digital information into a document image includes a background eliminating unit that determines whether pixels on an input image are pixels composing a background image and eliminates the pixels determined as the pixels composing the background image from the input image, and a watermark embedding unit that embeds a watermark into a background eliminated image from which the background is eliminated by the background eliminating unit so as to form a watermark image. A readable watermark can be embedded into a multi-valued image including a halftone/gradation portion on the background of the input image.

7 Claims, 14 Drawing Sheets

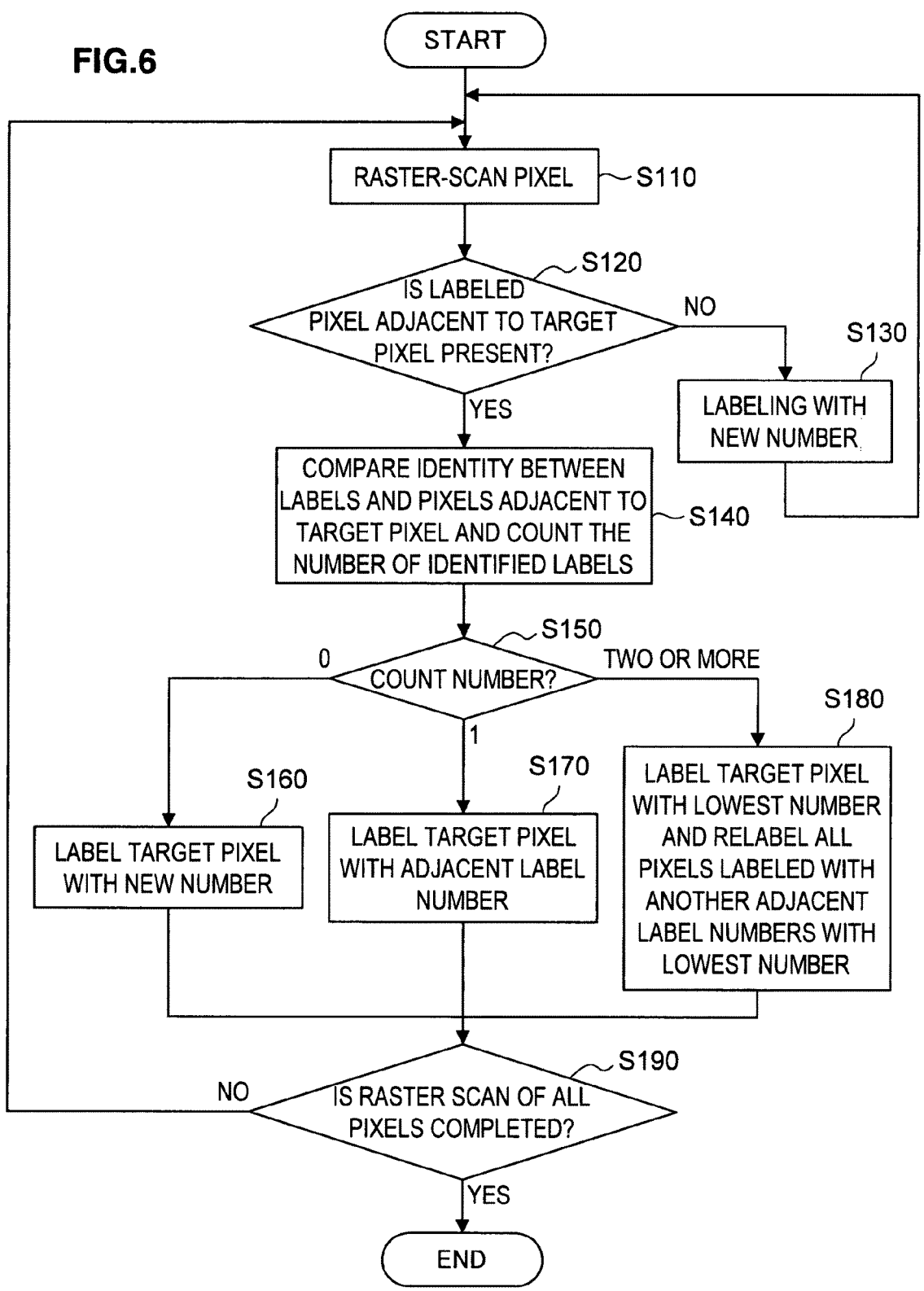

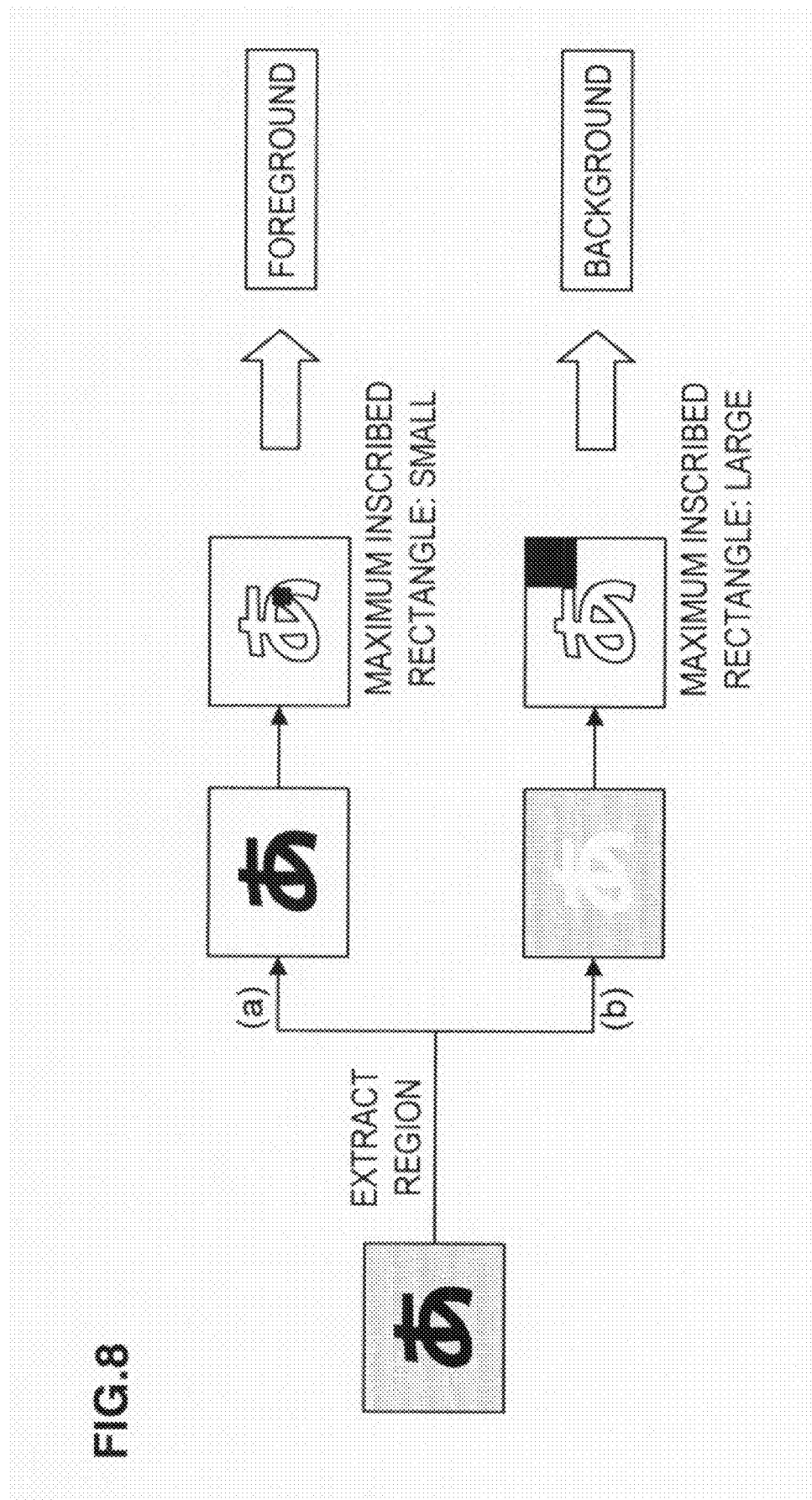

FIG.10A
FIG.10B
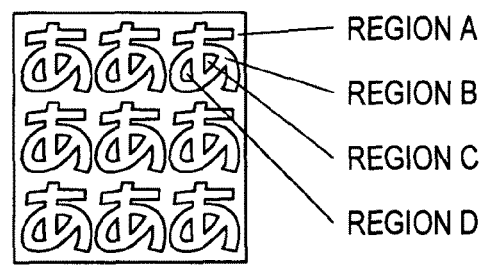
REGION A
REGION B
REGION C
REGION D
FIG.10C
| INCLUSION RELATION | LUMINANCE LEVEL |
|---|---|
| A ⊃ B | A > B |
| B ⊃ C | B < C |
| B ⊃ D | B < D |
FIG.10D
| INCLUSION RELATION | LUMINANCE LEVEL | |
|---|---|---|
| A ⊃ B | A > B | → A: BACKGROUND  B: FOREGROUND |
| B ⊃ C | B < C | → C: BACKGROUND  B: FOREGROUND |
| B ⊃ D | B < D | → D: BACKGROUND  B: FOREGROUND |
FIG.10E
| REGION A | BACKGROUND |
|---|---|
| REGION B | FOREGROUND |
| REGION C | BACKGROUND |
| REGION D | BACKGROUND |

⟵ DOT: LARGE          DOT: SMALL ⟶

WATERMARK DENSITY EXPRESSION IS IMPOSSIBLE | WATERMARK DENSITY EXPRESSION IS POSSIBLE

DENSITY EXPRESSION BY MEANS OF INPUT IMAGE | DENSITY EXPRESSION BY MEANS OF WATERMARK

APPARATUS AND METHOD FOR EMBEDDING ELECTRONIC WATERMARK

CROSS REFERENCE TO RELATED APPLICATIONS

The disclosure of Japanese Patent Application No. JP2006-30154, filed Feb. 7, 2006, entitled "Filtering System". The contents of that application are incorporated herein by reference in their entirety.

BACKGROUND OF THE INVENTION

1. Field of the Invention

The present invention relates to an electronic watermark embedding apparatus and an electronic watermark embedding method for embedding information into a document image using an electronic watermark technique.

2. Description of the Related Art

A technique for embedding information into a document image using an electronic watermark technique is disclosed in Japanese Patent No. 3628312. This document discloses a method of arranging pixels (dots) on a background of a document according to a predetermined method so as to be capable of adding confidential information or the like to the document. In this method, since a watermark is deleted from a portion where a character or the like of the document is overlapped with the watermark, the information on this portion cannot be read. However, redundancy is given to the watermark information so that the correct information can be entirely read. For example, the redundancy is given by repeatedly embedding a dot pattern showing identical information.

However, when a wide range of a document background is screened or the document includes large photograph or illustration, the information is broken up to the redundancy of the watermark information, and thus a watermark which can be sufficiently read cannot be embedded. A technique which copes with such a problem includes a technique disclosed in Japanese Patent Application No. 2005-326371 filed by the applicants of the present invention. This is a method of detecting the screening on a document image and replacing the detected screening by a watermark dot pattern having the same pixel density so as to be capable of embedding a readable watermark into an image with a large screened area. Concretely, dots of the screening are detected and periodicity of the dots is measured so that the screening and its pixel density are measured.

Since the method disclosed in Japanese Patent Application No. 2005-326371 is used for the screening, the method can be applied to a screened portion on a document image and an image binarized by a dithering method or the like. This method, however, cannot be applied to uniform half tone and a gradation portion on a multiple-valued image.

SUMMARY OF THE INVENTION

In view of the above problems of the conventional arts, it is an object of the present invention to provide new and improved electronic watermark embedding apparatus and electronic watermark embedding method for being capable of embedding a readable watermark into a multiple-valued image including halftone/gradation portion on a background of a document image.

In order to solve the problems, a first aspect of the present invention provides an electronic watermark embedding apparatus that embeds watermark information as digital information into a document image. The electronic watermark embedding apparatus of the present invention includes: a background determining unit that determines whether pixels on the document image are pixels composing a background image; a background eliminating unit that eliminates the pixels determined as the pixels composing the background image by the background determining unit from the document image; and a watermark embedding unit that embeds a watermark into a background eliminated image from which the background is eliminated by the background eliminating unit.

According to this constitution, a determination is made whether the pixels on the document image are pixels composing the background image, and the pixels composing the background image are eliminated from the document image so that the background eliminated image is obtained. When a watermark is embedded into the background eliminated image, a readable watermark can be embedded into a multiple-valued image including a halftone/gradation portion on the background on the document image.

The present invention provides an electronic watermark embedding apparatus that embeds watermark information as digital information into a document image. The electronic watermark embedding apparatus includes: a background determining unit that determines pixels on the document image are pixels composing a background image; a background separating unit that separates the document image into a foreground image and the background image on the basis of the determined result of the background determining unit; and a watermark embedding unit that embeds a watermark into the foreground image output by the background separating unit. The watermark embedding unit changes concentration or density of the watermark to be embedded into the foreground image according to contents of the background image.

According to this constitution, a determination is made whether the pixels on the document image are pixels composing the background image, the document image is separated into the foreground image and the background image, and the watermark is embedded into the foreground image. As a result, a readable watermark can be embedded into a multiple-valued image including a halftone/gradation portion on the background on the document image. Further, at least one of concentration and density of the watermark to be embedded into the foreground image is changed according to contents of the background image, so that the watermark can be embedded without deteriorating visual effects.

In the electronic watermark embedding apparatus, the background separating unit may include a limit level adjusting unit that separates a portion on the background image with a concentration level not less than a limit level to a foreground image side when the watermark concentration level changeable by the watermark embedding unit has a limit. According to such a constitution, in a watermark embedding method with limited watermark concentration, a watermark can be embedded into an input image with concentration not less than the limit without deteriorating visual effects.

The background determining unit determines halftone, gradation or photograph on a multiple-valued image as the background.

The background determining unit can include: a region extracting unit that groups pixels with the same feature in the image as a region; and a region determining unit that determines whether the pixels on the document image compose the background image on the basis of the feature of the region extracted by the region extracting unit. In this case, the feature of the pixels grouped as one region by the region extracting unit is such that a luminance level or a color of the pixels are the same or are within a range of predetermined thresholds.

The region determining unit can determine the region according to the following methods (1) to (4). A plurality of the following determining methods may be combined, or each of them is weighted so that the determination is made based on a total evaluated point.

(1) A determination is made on the basis of at least one of a luminance level, color information, a size, an area, a boundary length and a wavelength after frequency conversion of the region.

(2) A size of a circle or a polygon which is maximally inscribed in the region is measured and a determination is made on the basis of the size of an inscribed graphic.

(3) A difference in luminance or color information between the region and a region adjacent to the region is measured, and a determination is made on the basis of the difference in the luminance or the color information.

(4) A region including the region is extracted, and a determination is made on the basis of luminance or color information between the region and the inclusion region.

In order to solve the above problem, a second aspect of the present invention provides an electronic watermark embedding method for embedding watermark information as digital information into a document image includes the steps of determining whether pixels on the document image are pixels composing a background image; eliminating the pixels determined as the pixels composing the background image from the document image; and embedding a watermark into a region of the eliminated background image.

According to this method, a determination is made whether the pixels on the document image are pixels composing the background image, and the pixels composing the background image are eliminated from the document image. Thereafter, a watermark is embedded so that a readable watermark can be embedded into a multiple-valued image including a halftone/gradation portion on the background of the document image.

The present invention provides an electronic watermark embedding method for embedding watermark information as digital information into a document image includes the steps of: determining whether pixels on the document image are pixels composing a background image; separating the document image into a foreground image and the background image; and changing concentration or density of the watermark according to contents of the background image so as to embed the watermark into the foreground image.

According to this method, a determination is made whether the pixels on the document image are pixels composing the background image, the document image is separated into the foreground image and the background image, and a watermark is embedded into the foreground image. As a result, a readable watermark can be embedded into a multiple-valued image including a halftone/gradation portion on the background of the document image. Further, at least one of concentration and density of the watermark to be embedded into the foreground image is changed according to contents of the background image, so that the watermark can be embedded without deteriorating visual effects.

Another aspect of the present invention provides a program for allowing a computer to operate as the electronic watermark embedding apparatus from the first aspect, and a recording medium readable by a computer in which the program is recorded. The program may be described by any program language. Further, the recording medium includes recording media such as CD-ROM, DVD-ROM and flexible disc which are currently and generally used for recording of the program, or any recording media which are used in the future.

According to the present invention, a readable watermark can be embedded into a multiple-valued image including a halftone/gradation portion on the background of the document image. Further, the concentration or density of the watermark to be embedded into the foreground image is changed according to contents of the background image, so that the watermark can be embedded without deteriorating visual effects. The other excellent effects of the present invention are explained in detail in the preferred embodiments for carrying out the invention.

BRIEF DESCRIPTION OF THE DRAWINGS

FIG. 6 is a flowchart illustrating a labeling process (step S102);

FIGS. 8A and 8B are explanatory diagrams illustrating a foreground/background determining method (1);

FIGS. 10A to 10E are explanatory diagrams illustrating the foreground/background determining method (3);

DETAILED DESCRIPTION OF THE PREFERRED EMBODIMENTS

Figure 1:
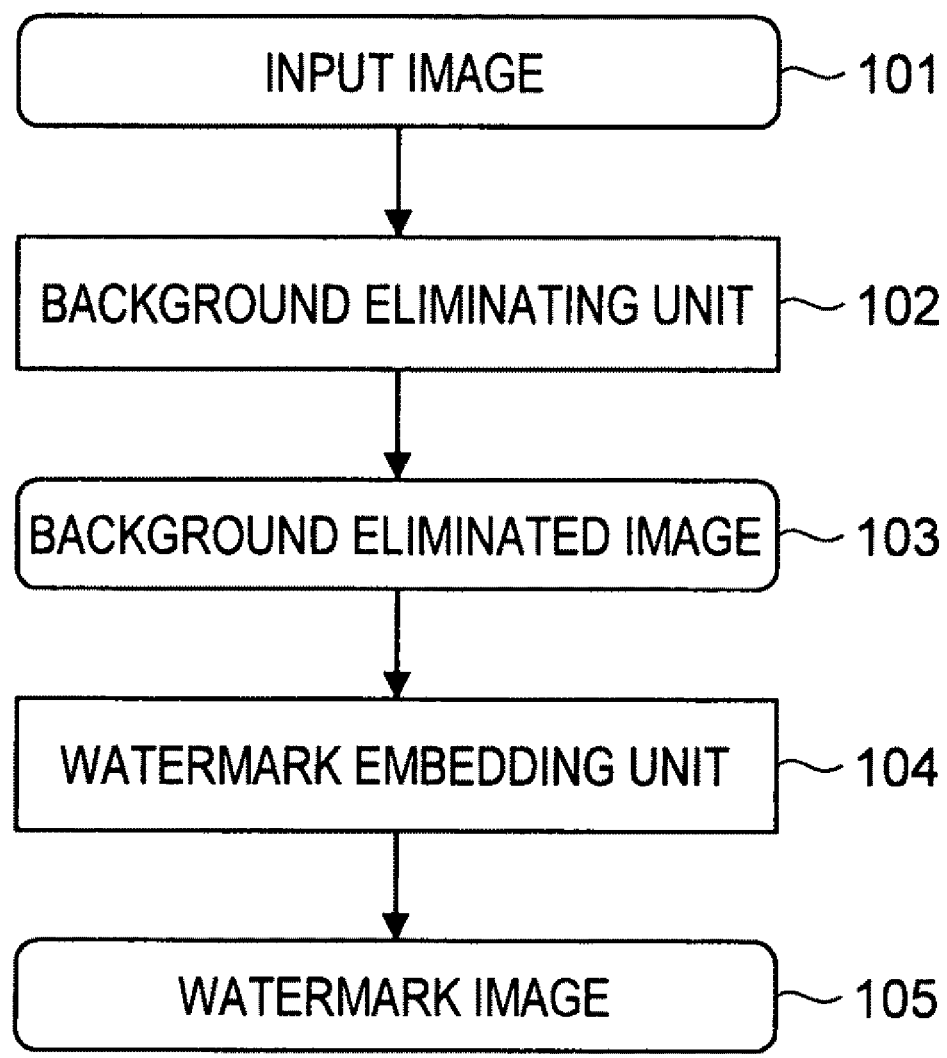
FIG. 1 is an explanatory diagram illustrating a constitution of an electronic watermark embedding apparatus according to a first embodiment.

An apparatus and a method for embedding an electronic watermark according to preferred embodiments of the present invention are explained in detail below with reference to the accompanying drawings. In this specification and the drawings, like members are designated by like reference numerals, and overlapped explanation thereof is omitted.

First Embodiment

FIG. 1 is an explanatory diagram illustrating a constitution in a first embodiment.

As shown in FIG. 1, an electronic watermark embedding apparatus 100 according to the first embodiment includes a background eliminating unit 102 that eliminates a background from an input image 101, and a watermark embedding unit 104 that embeds an electronic watermark into an input background eliminated image 103 from which the background is eliminated. The watermark embedding unit 104 outputs a watermark image 105 into which the electronic watermark is embedded. The respective components are explained in more detail below.

Figure 2:
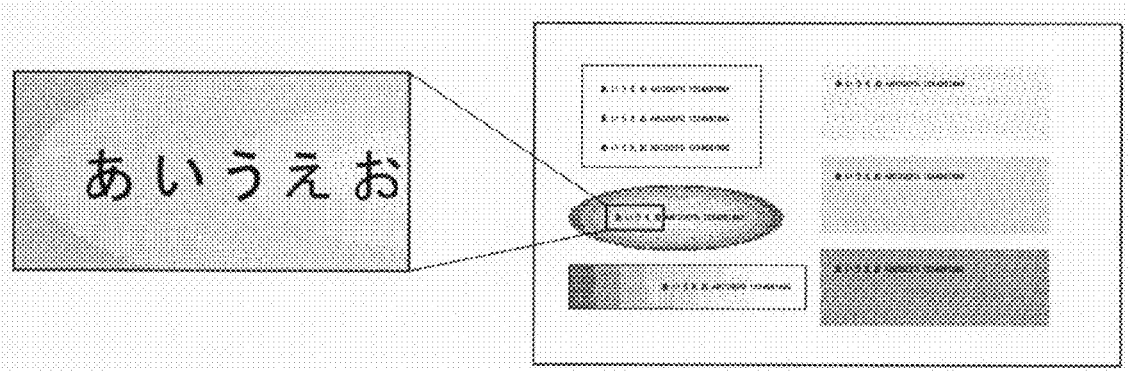
FIG. 2 is an explanatory diagram illustrating an input image.

FIG. 2 is an explanatory diagram illustrating one example of the input image 101.

The input image 101 is image data to which a watermark is to be embedded, namely, a document image on which characters or graphics and photographs are drawn. The input image 101 is premised on a multi-valued image. When the input image is screened, the input image 101 may be an output result from which the screening is eliminated by the technique disclosed in Japanese Patent Application No. 2005-326371 filed by the inventors of the present invention.

The technique disclosed in Japanese Patent Application No. 2005-326371 is a method for detecting screening on a document image and replacing the detected screening by a watermark dot pattern having the same pixel density so as to be capable of embedding a readable watermark into an image with a large screened area. Concretely, dots of the screening are detected and periodicity of the dots is measured so that the screening and its pixel density are measured. This embodiment explains a monochrome image as a premise, but when "luminance level" in the explanation is replaced by "color information and luminance level", the invention can also be applied to a color image.

The background eliminating unit 102 eliminates halftone/gradation portion (hereinafter, background portion) other than character and graphic outline (hereinafter, foreground portion) in order to facilitate embedding of a watermark into the input image 101. The background eliminating unit 102 according to the first embodiment is an operation unit corresponding to a background determining unit and a background eliminating unit of the present invention. A foreground/background determining method is further explained in the operation of the first embodiment.

Figure 3:
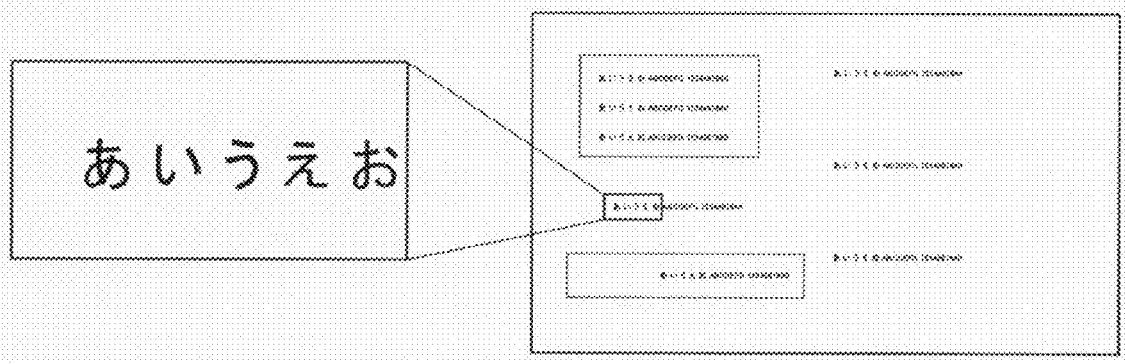
FIG. 3 is an explanatory diagram illustrating a background eliminated image in the first embodiment.

The background eliminated image 103 is an image where the background eliminating unit 102 eliminates the background portion from the input image. FIG. 3 is an explanatory diagram illustrating one example of the background eliminated image 103. FIG. 3 illustrates a state that the halftone and gradation portions or the like of the background are eliminated as contrast with the input image 101 of FIG. 2.

Figure 4:
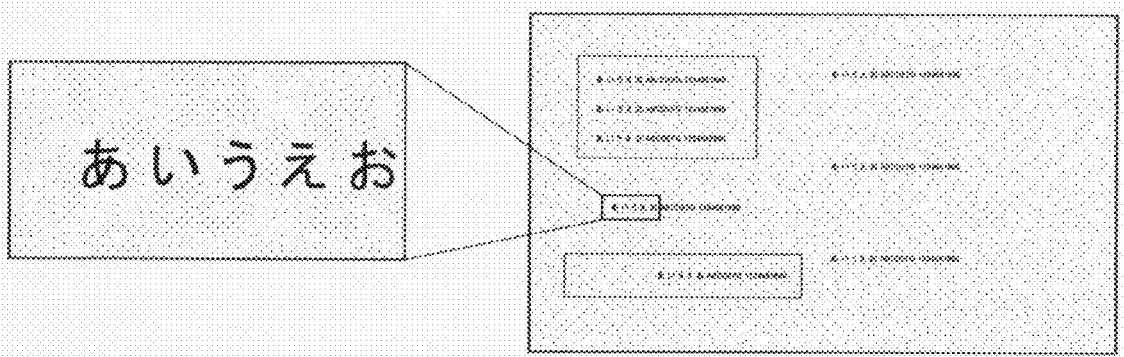
FIG. 4 is an explanatory diagram illustrating a watermark image.

The watermark embedding unit 104 is for embedding watermark information into the background eliminated image 103. As the embedding method, the method disclosed in Japanese Patent No. 03628312 can be used, for example. In the disclosed method, a plurality of dot patterns whose wave direction and/or wavelength is changed by arrangements of dots are prepared, and one symbol is given to one dot pattern. The dot patterns are combined to be arranged so that watermark information is given. FIG. 4 is an explanatory diagram illustrating one example of such a watermark image 105.

The background eliminating unit 102 and the watermark embedding unit 104 may be constituted as one apparatus.

(Operation of the First Embodiment)

Figure 5:
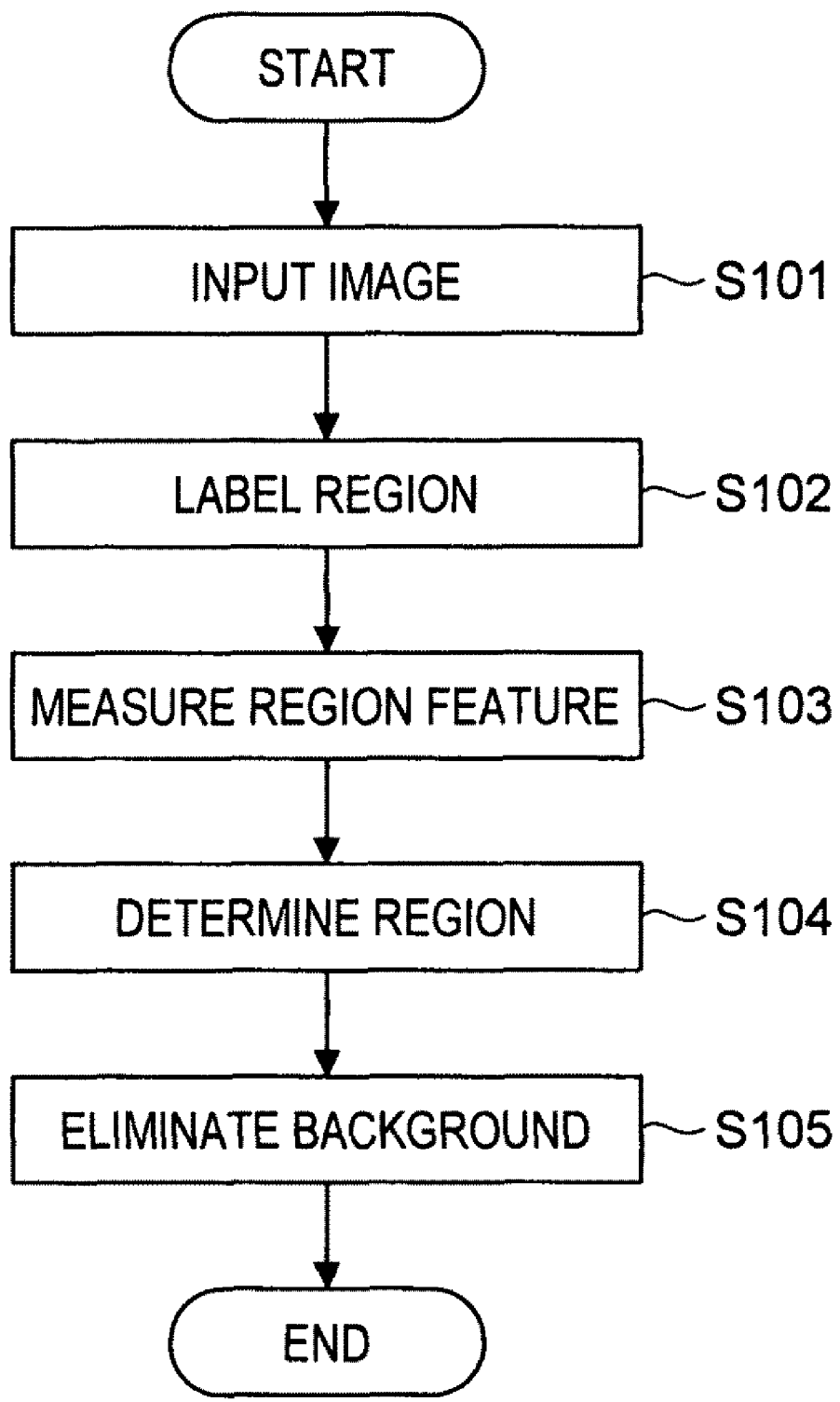
FIG. 5 is a flowchart illustrating an operation of a background eliminating unit 102 in the first embodiment.

The operation of the background eliminating unit 102 is explained in detail. FIG. 5 is an explanatory diagram illustrating a processing flow of the background eliminating unit 102. FIGS. 6 to 10 are explanatory diagrams for explaining the operation of the background eliminating section 102.

<Image Input (Step S101)>

The input image 101 is input into the background eliminating unit 102. The input image 101 is a document image on which characters, graphics or photographs are drawn.

<Region Extraction (Step S102)>

Respective adjacent pixels having the same feature on the input image 101 are labeled, which are extracted as a region. The labeling is carried out by the following method, for example. FIG. 6 is an explanatory diagram illustrating the processing flow of the labeling method, and FIGS. 7A to 7C are explanatory diagrams illustrating images at each step of the labeling process.

Figure 7A:
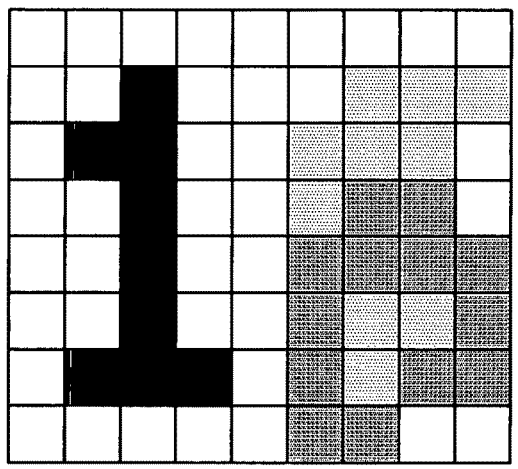
FIGS. 7A to 7C are explanatory diagrams illustrating the labeling process (step S102)
Figure 7B:
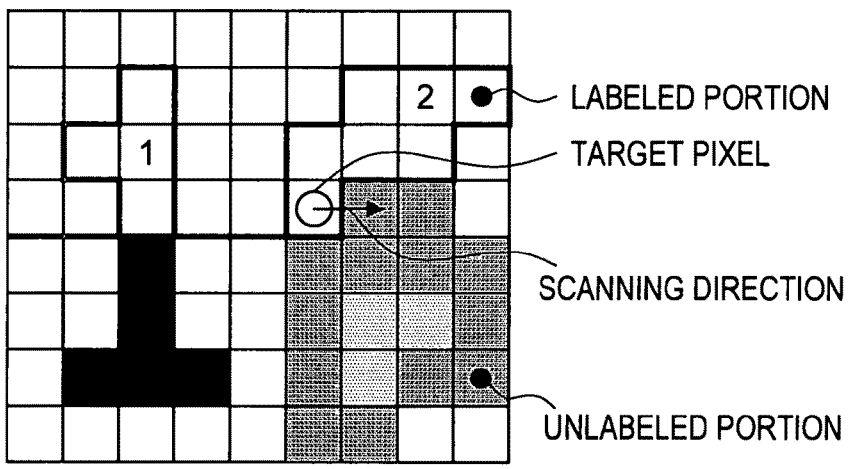
Figure 7C:
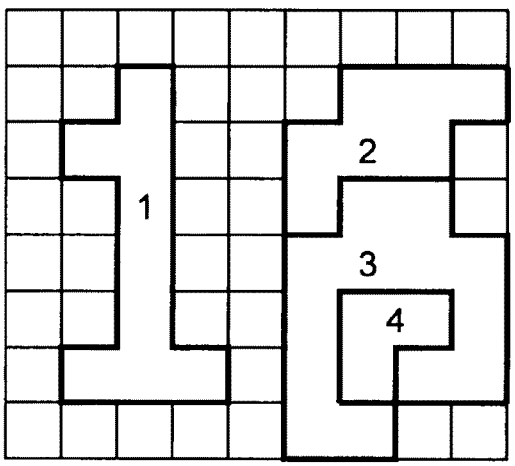

On the input image shown as one example in FIG. 7A, pixels are raster-scanned (step S110), and an inspection is made whether a target pixel and labeled adjacent pixels are present (step S120). When the target pixel and the adjacent labeled pixels are not present, a pixel is labeled by new number (step S130), and the sequence returns to step S110.

When the target pixel and the adjacent labeled pixels are present, identities of the target pixel and the adjacent labeled pixels are compared, and the number of labels determined as identical is counted (step S140). As to the standard of the determination of the identities of pixels, in the simplest way, pixels having the same luminance level are determined as identical. In order to efficiently label portions of noise, gradation and the like where the luminance continuously changes, after the luminance level is quantized, the identity may be determined. That is to say, labels having luminance level within a given range may be determined as identical.

The following process is executed according to the count number of the labels determined as identical (step S150). When the count number is 0, the target pixel is labeled by a new number (step S160). When the count number is 1, the target pixel is labeled by an adjacent label number (step S170). When the count number is 2 or more, the target number is labeled by the lowest number, and adjacent label numbers of all labeled pixels are replaced by lowest label numbers (step S180).

A determination is made whether all the pixels are completely raster-scanned (step S190). When not all the pixels are completely raster-scanned, the sequence returns to step S110. FIG. 7B illustrates a state that the raster scanning process proceeds on an about half portion of the input image, namely, a state that two portions are labeled ("1" and "2").

When all the pixels are completely raster-scanned, the process is ended. FIG. 7C illustrates a state that the raster scanning is completely ended and region labeling is executed, and four portions are labeled ("1", "2", "3" and "4").

The region labeling process (step S102) has been explained in detail above. The following process in the first embodiment is explained below with reference to FIG. 5.

<Region Feature Measurement (Step S103)>

A feature amount for determining a region to be capable of being eliminated in the region extracted at step S102 is measured. As to the feature amount, the luminance level, the area, the boundary length, the minimum circumscribed rectangle size, the maximum inscribed rectangle size, the adjacent area and the like of the region are measured, for example.

<Region Determination (Step S104)>

A determination is made based on the value measured at step S103 whether each region is a foreground (character or graphic) or a background. The determination can be made by using any one of the following methods.

<Foreground/Background Determining Method (1)>

A foreground/background determining method (1) is a method of setting a threshold of a size of a maximum inscribed graphic of the character or the outline. FIG. 8A illustrates a rectangle which inscribes the character or the outline, and FIG. 8B illustrates a rectangle which inscribes the background. In the case of the character and the outline, since the maximum inscribed rectangle is smaller than the background, the determination is made by setting the threshold of the size of the maximum inscribed rectangle. The method is not limited to the rectangle, and the determination may be made by the size of a circle or a polygon.

<Foreground/Background Determining Method (2)>

Figure 9A:
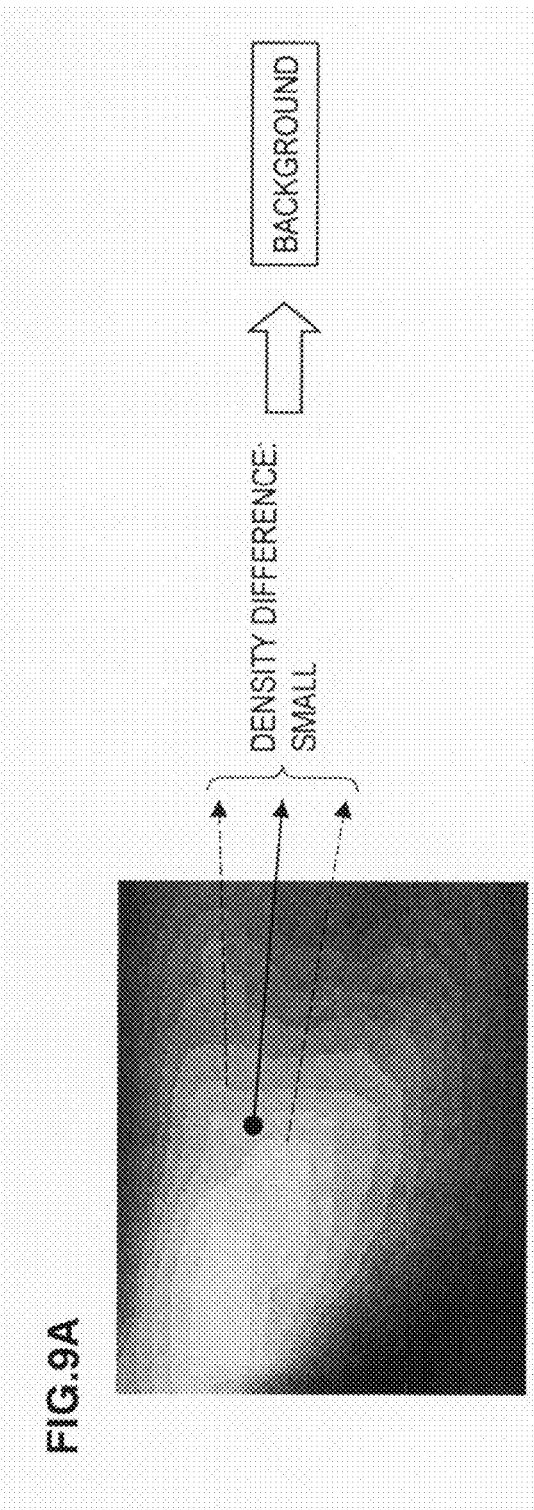
FIGS. 9A and 9B are explanatory diagrams illustrating the foreground/background determining method (2)
Figure 9B:
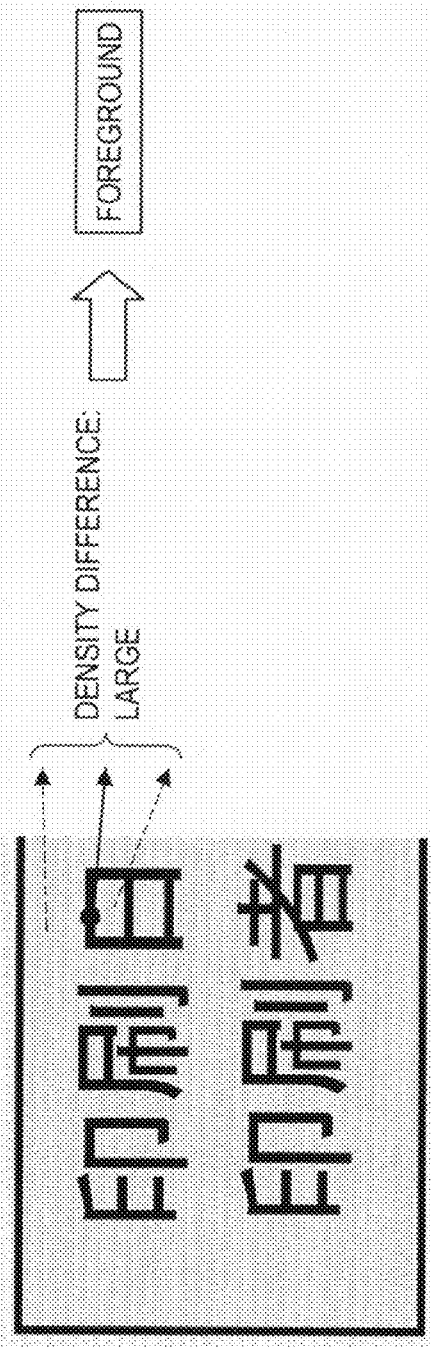

A foreground/background determining method (2) is a method of measuring a difference in luminance or color information of a region adjacent to the region, and making a determination on the basis of the difference in luminance or color information. FIG. 9A illustrates a concentration difference of gradation (or a region in a photograph image), and FIG. 9B illustrates a concentration difference of the characters. Since boundary pixels of a certain pixel have similar luminance in the region of the gradation and the photograph image, the region where the difference in the luminance level between that region and the adjacent region is small is determined as a background.

<Foreground/Background Determining Method (3)>

A foreground/background determining method (3) is a method of making a determination by paying an attention to an inclusion relation of the region. As shown in FIGS. 10A to 10E, regions are extracted (b) from an input image (a), and a region including one region is extracted. In the example of FIG. 10B, regions A, B, C and D are extracted from a periphery of a character "あ". As shown in FIG. 10C, the inclusion relation and the luminance level of the regions A, B, C and D are determined. Since a tone or the like which is behind the character contacts an outer periphery of the character region entirely, when the region including one region is present, a side where the luminance level is higher (side closer to white) is determined as the background. Concretely, as shown in FIG. 10D, since $A \supset B$ and $A > B$, the determination is made that A is the background and B is the foreground. Similarly, since $B \supset C$ and $B < C$, the determination is made that C is the background and B is the foreground, and since $B \supset D$ and $B < D$, the determination is made that D is the background and the B is the foreground. In such a manner, the determination can be made that the region A is the background, the region B is the foreground, the region C is the background and the region D is the background as shown in FIG. 10E.

<Foreground/Background Determining Method (4)>

Figure 11:
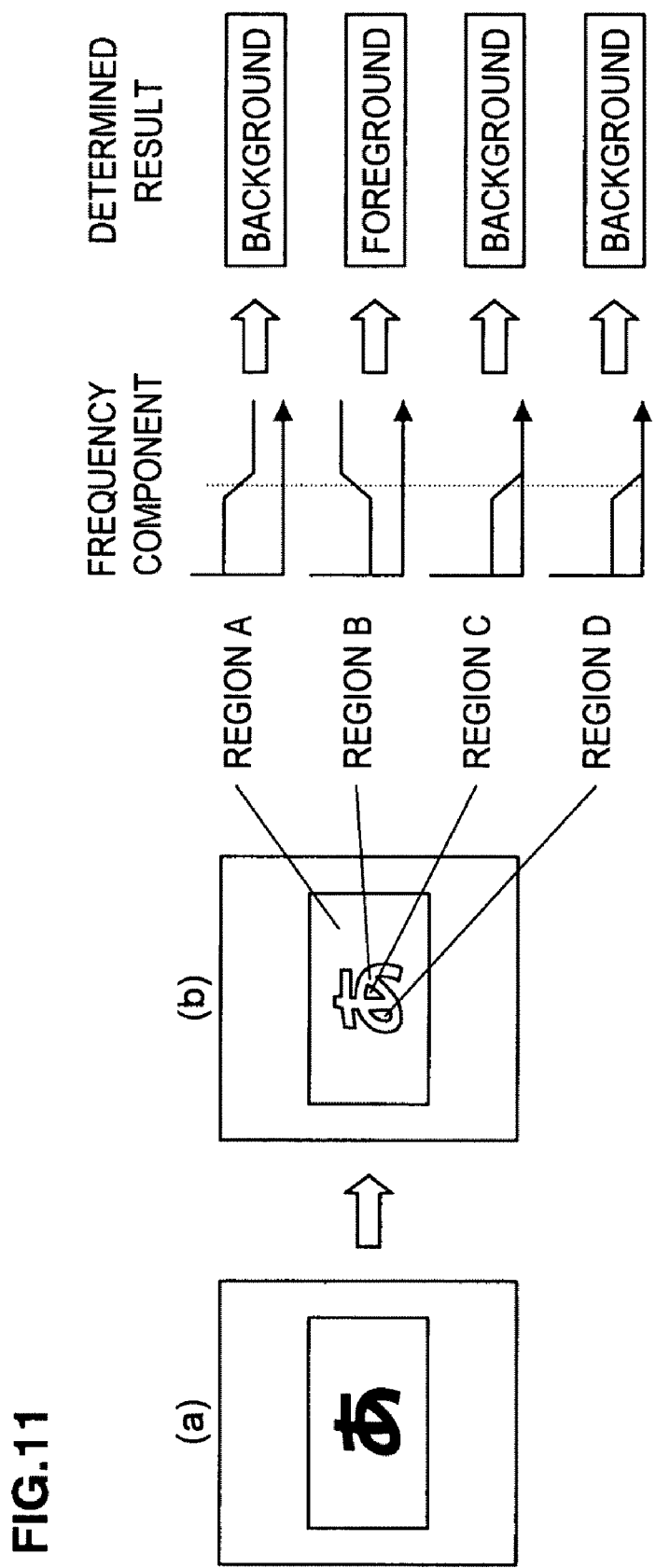
FIG. 11 is an explanatory diagram illustrating the foreground/background determining method (4)

A foreground/background determining method (4) is a method of making a determination on the basis of a result of converting the region image into a frequency domain. As shown in FIG. 11, a region is extracted from the input image (b), and a region including one region is extracted. A frequency component is determined for each region. Since the character is a region where a lot of thin lines gather together, the high-frequency component increases. On the contrary, a lot of low-frequency components are detected on a uniform tone portion. A threshold is set for a given frequency, for example, and a region with frequency component higher than the threshold is determined as a character. In the example of FIG. 11, since the region B has a lot of frequency components higher than the threshold, the region B is determined as the foreground, and the other regions A, C and D are determined as the background. Also in the region A, a high frequency component similar to that of the character is detected on the background which contacts the character, but since a low frequency component is detected on the other portions, the region A can be determined as the background.

The concrete examples of the methods of determining whether each region is the foreground (character or graphic) or the background are explained above. A plurality of the above methods may be combined for the determination, or each of them is weighted so that the determination is made based on a total evaluated point. The following process in the embodiment is explained with reference to FIG. 5.

<Background Elimination (Step S105)>

The region which is determined as the background at step S104 is eliminated. As to the eliminating method, for example the region is replaced by white pixels. In another manner, the pixels are not completely eliminated, and the luminance level may be made to be close to a given value or white of a given percentage. The background eliminated image 103 shown in FIG. 3 is output by this process. Thereafter, the watermark embedding unit 104 can embed a watermark into the background eliminated image 103, and the watermark image 105 shown in FIG. 4 is output. The watermark having sufficient reading ability can be embedded by eliminating the background.

<Effect of the First Embodiment>

According to the first embodiment, even when the background of the document image includes halftone, gradation or photograph image, a watermark having sufficient reading ability can be embedded thereinto.

A computer program for realizing the above function is incorporated into a computer, so that the computer can be operated as the electronic watermark embedding apparatus 100 according to the first embodiment. Such a computer program can be distributed to the market in such a manner that the program is recorded in predetermined recording media (for example, CD-ROM) or the program is downloaded via an electronic network. This is applied also to the electronic watermark embedding apparatuses to be explained in second and third embodiments.

Second Embodiment

The second embodiment of the present invention is explained. The second embodiment is different from the first embodiment in that the background eliminated in the first embodiment is reproduced by express of watermark concentration at the time of embedding the watermark. The portion different from the first embodiment is mainly explained below.

Figure 12:
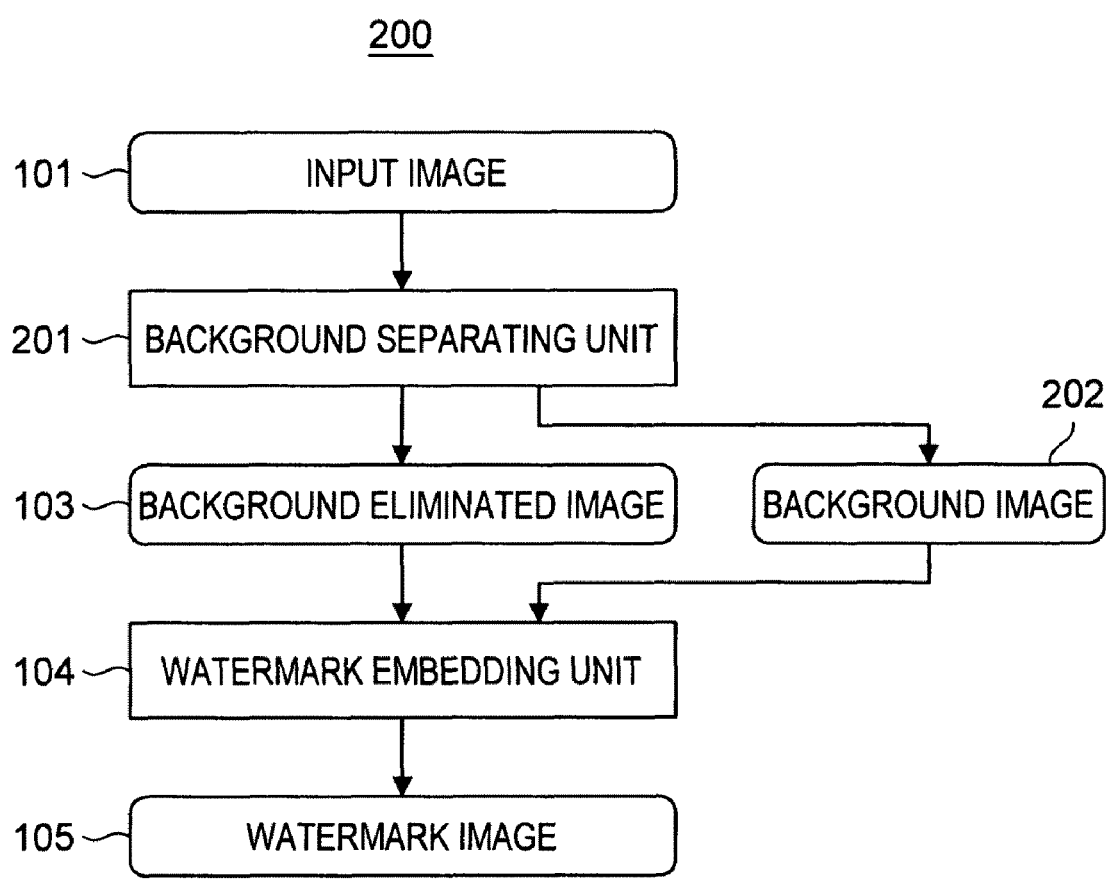
FIG. 12 is an explanatory diagram illustrating a constitution of the electronic watermark embedding apparatus according to a second embodiment.
Figure 13A:
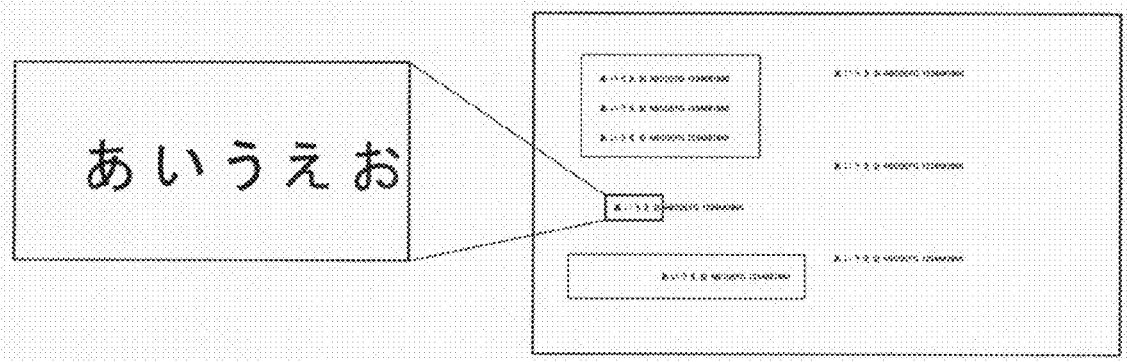
FIGS. 13A to 13C are explanatory diagrams illustrating foreground and background images and watermark images in the second embodiment.
Figure 13B:
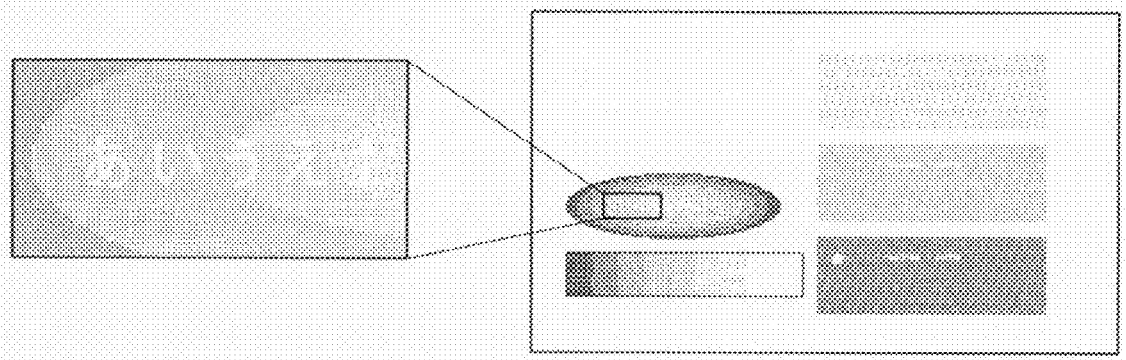
Figure 13C:
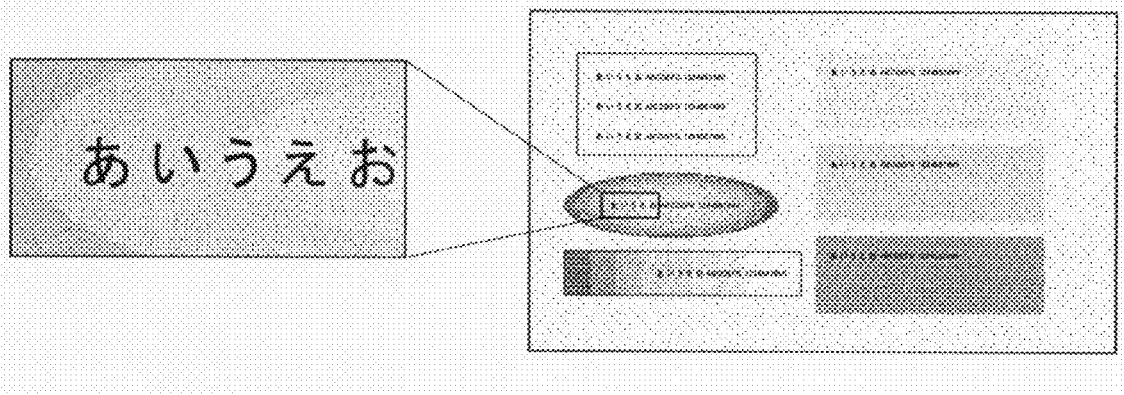
Figure 14:
FIG. 14 is an explanatory diagram illustrating enlarged FIG. 13C.

FIG. 12 is an explanatory diagram illustrating a constitution of the second embodiment. FIGS. 13A to 14 are explanatory diagrams illustrating processing images in the second embodiment.

A background separating unit 201 eliminates halftone/gradation portions (hereinafter, background portions) other than a character or graphic outline in order to make the embedding of a watermark into the input image 101 easy. The background separating unit 201 separately outputs an image from which the background portions are eliminated and an image (background image) of the eliminated background portions. The background separating unit 201 in the second embodiment is an operating unit corresponding to the background determining unit and the background separating unit of the present invention.

The background image is an image expressing an eliminated background. The background image may be encoded with the shape and the luminance level of the background region so that data may be obtained. FIG. 13A illustrates the foreground image from which the background portions are eliminated, and FIG. 13B illustrates the background image.

(Operation of the Second Embodiment)

Figure 15:
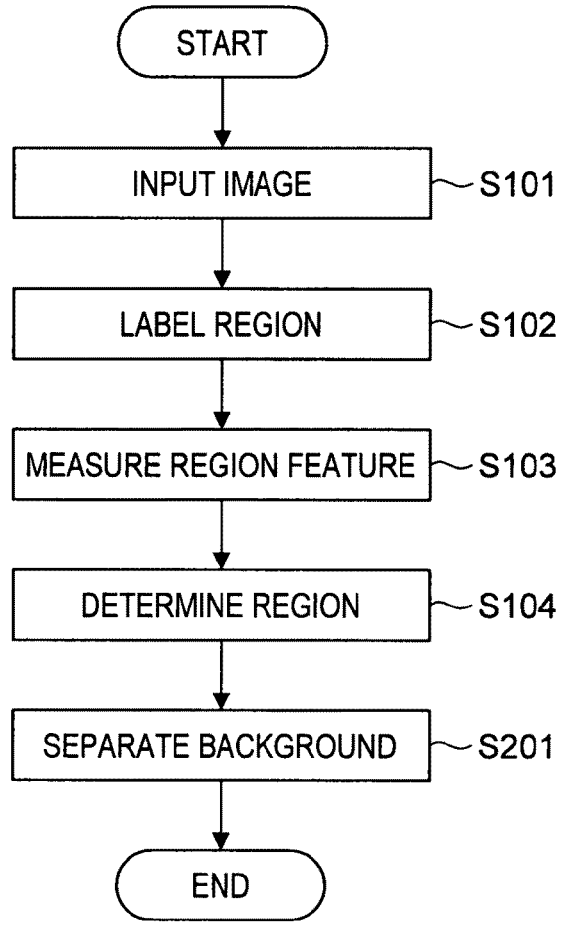
FIG. 15 is a flowchart illustrating an operation of a background separating unit 201 in the second embodiment.

The operations of the background separating unit 201 and the watermark embedding unit 104 in the second embodiment are explained. FIG. 15 illustrates a process flow of the second embodiment. The portion different from the first embodiment is mainly explained below.

The image input (step S101), the region extraction (step S102), the region feature measurement (step S103) and the region determination (step S104) are substantially similar to those in the first embodiment.

<Background Separation (Step S201)>

The region determined as the background by the region determination (step S104) is separated from the input image. For example, the background region on the input image is replaced by white pixels, and the region is drawn on the same position on the background image. FIG. 13A illustrates the foreground image from which the background portions are eliminated, and FIG. 13B illustrates the background image.

The watermark embedding unit 104 embeds a watermark into the foreground image. At this time, the concentration or the pixel density of a watermark dot pattern are changed according to luminance information about the background image. In such a manner, the concentration of the background portions can be maintained, so that the watermark can be embedded without deteriorating visual effects. FIG. 13C illustrates the watermark image output by the watermark embedding unit 104 in the second embodiment.

FIG. 14 is an enlarged diagram of FIG. 13C. The size of the dots in the dot pattern is gradually changed, so that the watermark image can be seen like the gradation of the background on the original image. Besides changing the size of the dots in the dot pattern, the gradation can be expressed by changing the dot density.

<Effect of the Second Embodiment>

According to the second embodiment, even when the background of the document image includes halftone, gradation or photograph image, a watermark can be embedded thereinto. According to the second embodiment, since the concentration of the background portions are maintained, the watermark can be embedded without deteriorating visual effects.

Third Embodiment

A third embodiment of the present invention is explained. The third embodiment is different from the first and second embodiments in that when a range where the concentration can be expressed in the watermark embedding is limited, only the expressible range is separated as the background. When the concentration level is increased in the watermark using the dot pattern, the concentration level is increased by increasing a dot diameter or the like as explained in the second embodiment, but the increase in the readable concentration level is limited. For example, when the concentration is closer to intense black, reading is impossible. Watermark reading accuracy is deteriorated or the reading cannot be executed at all at the concentration level not less than the limit. For this reason, it is assumed that the concentration level of a watermark provided by the watermark embedding apparatus is limited. In the third embodiment, in this case, a watermark can be embedded by changing the background separating method.

Figure 16A:
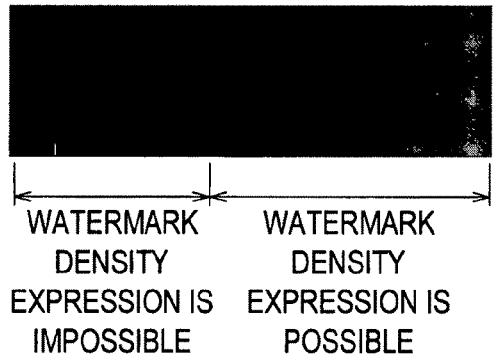
FIGS. 16A to 16C are explanatory diagrams illustrating the foreground and background images and the watermark images in a third embodiment.
Figure 16B:
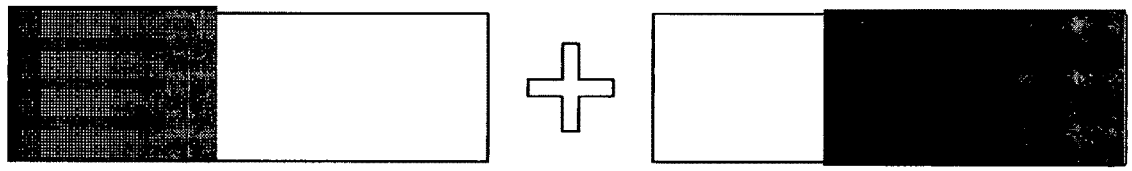
Figure 16C:
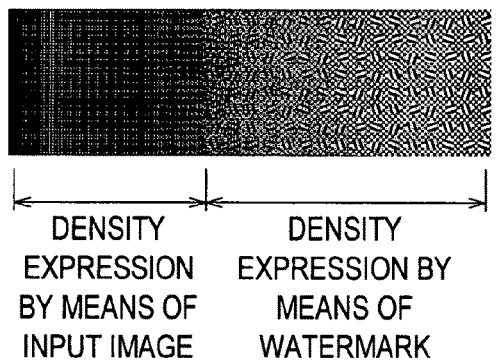

Since the constitution of the third embodiment is the same as that of the second embodiment (FIG. 12), the explanation thereof is omitted. FIGS. 16A to 16C are explanatory diagrams illustrating process image samples in the third embodiment.

(Operation of the Third Embodiment)

Figure 17:
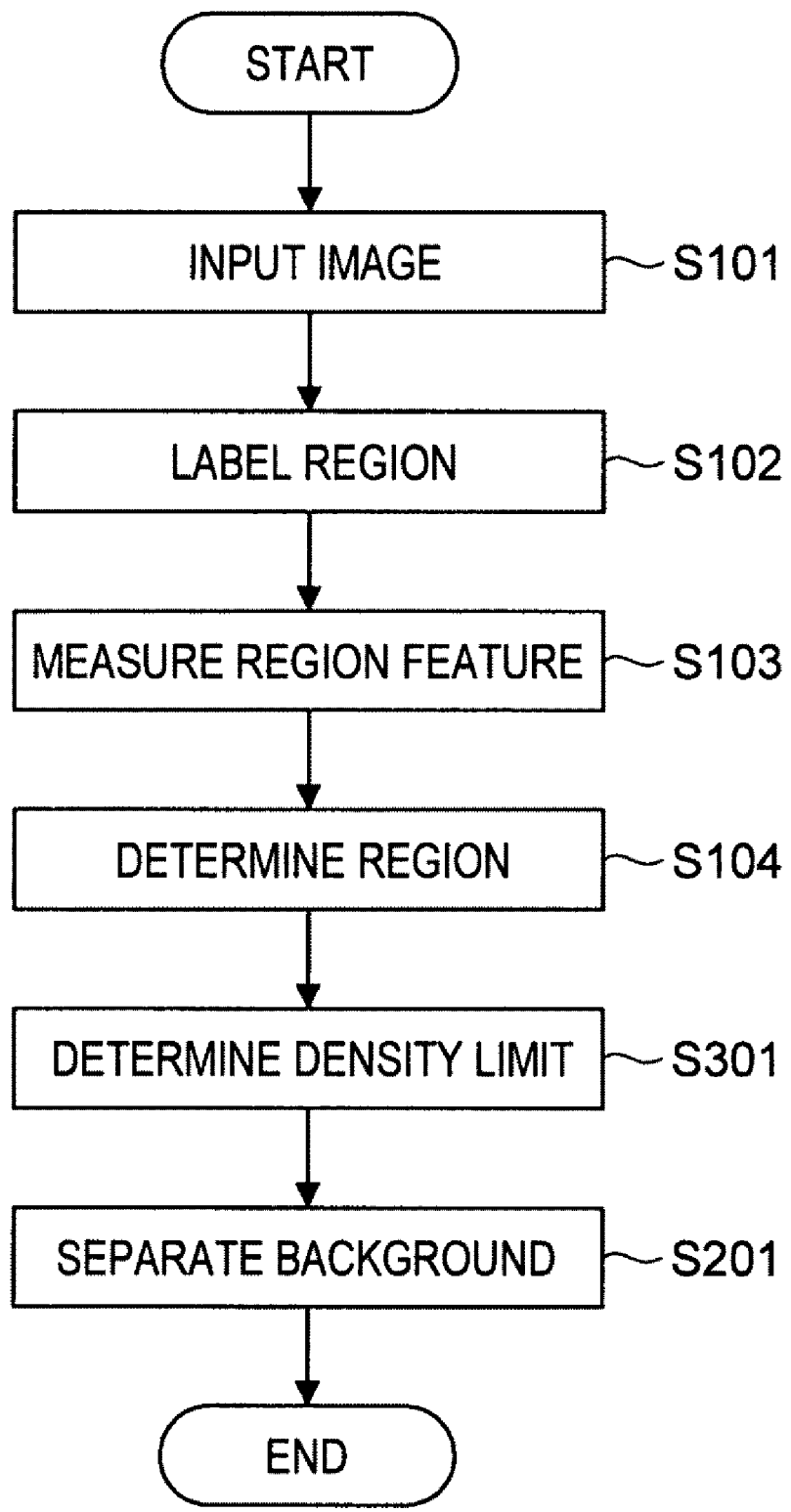
FIG. 17 is a flowchart illustrating an operation of the background separating unit 201 in the third embodiment.

FIG. 17 illustrates a processing flow of the background separating unit 201 according to the third embodiment. The portions different from the first and second embodiments are mainly explained below.

The image input (step S101), the region extraction (step S102), the region feature measurement (step S103) and the region determination (step S104) are substantially similar to those in the first and second embodiments.

<Density Limit Determination (Step S301)>

Some of the regions, which are determined as the background at the region determining process (step S104) whose luminance level exceeds the expressible limit in the watermark embedding, are treated similarly to the foreground, and no watermark is embedded thereinto. In FIG. 16A, the region on the input image determined as the background is shown by gradation. As shown in FIG. 16B, a region of the gradation whose luminance level exceeds the expressible limit in the watermark embedding is treated similarly to the foreground, and no watermark is embedded thereinto. A given value may be used as the limit luminance level, or the limit luminance level may be changed according to the embedding strength of a watermark or an area of the background portion.

Thereafter, the backgrounds are separated (step S201) similarly to the second embodiment. As shown in FIG. 16C, a watermark is embedded only into the background image. On a portion where the watermark concentration cannot be expressed, the concentration is expressed on the input image, and the concentration is expressed by a watermark on a portion where the watermark concentration is expressible.

(Effect of the Third Embodiment)

According to the third embodiment, in the watermark embedding method where the watermark concentration is limited, a watermark can be embedded without deteriorating visual effects even on the input image with concentration not less than the limit.

The apparatus and method for embedding electronic watermarks according to the preferred embodiments of the present invention are explained above with reference to the accompanying drawings, but the present invention is not limited to the example. Those skilled in the art apparently can arrive at various modified examples or corrected examples within the scope of the technical idea described in claims. It is naturally understood that the modified examples or the corrected examples are included in the field of the present invention.

The present invention can be used for the apparatus and the method for embedding an electronic watermark into a document image using the electronic watermark embedding technique.

What is claimed is:

1. An electronic watermark embedding apparatus that embeds watermark information as digital information into a document image, the apparatus comprising:
   a background determining unit that determines whether pixels in the document image are pixels composing a background image, wherein the background determining unit includes:
   a region extracting unit that examines adjacent pixels, and groups adjacent pixels that have a feature in common into one of at least one extracted region, and
   a region determining unit that determines whether each at least one extracted region is a region of the background image and has pixels that are to be included in the background image;

a background eliminating unit that eliminates the pixels determined to be included in the background image by the background determining unit from the document image; and a watermark embedding unit that embeds a watermark into a background eliminated image from which the background is eliminated by the background eliminating unit.

2. The electronic watermark embedding apparatus according to claim 1, wherein the background determining unit determines halftone, gradation or a photograph in a multiple-valued image as the background.

3. The electronic watermark embedding apparatus according to claim 1, wherein the feature in common of the pixels grouped as one extracted region by the region extracting unit is such that a luminance level or a color of the pixels are the same or are within a range of predetermined thresholds.

4. The electronic watermark embedding apparatus according to claim 1, wherein the region determining unit makes a determination on the basis of at least one of a luminance level, color information, a size, an area, a boundary length and a wavelength.

5. The electronic watermark embedding apparatus according to claim 1, wherein the region determining unit measures a size of a circle or a polygon which is maximally inscribed in the region and makes a determination on the basis of the size of an inscribed graphic.

6. The electronic watermark embedding apparatus according to claim 1, wherein the region determining unit measures a difference in luminance or color information between the region and a region adjacent to the region, and makes a determination on the basis of the difference in the luminance or the color information.

7. The electronic watermark embedding apparatus according to claim 1, wherein the region determining unit extracts a region including an inclusion region and makes a determination on the basis of luminance or color information between the region and the inclusion region.

\* \* \* \* \*